C. H. LINDSTROM.
DECAPITATING INSTRUMENT.
APPLICATION FILED APR. 22, 1913.
1,090,317.
Patented Mar. 17, 1914.
2 SHEETS—SHEET 1.
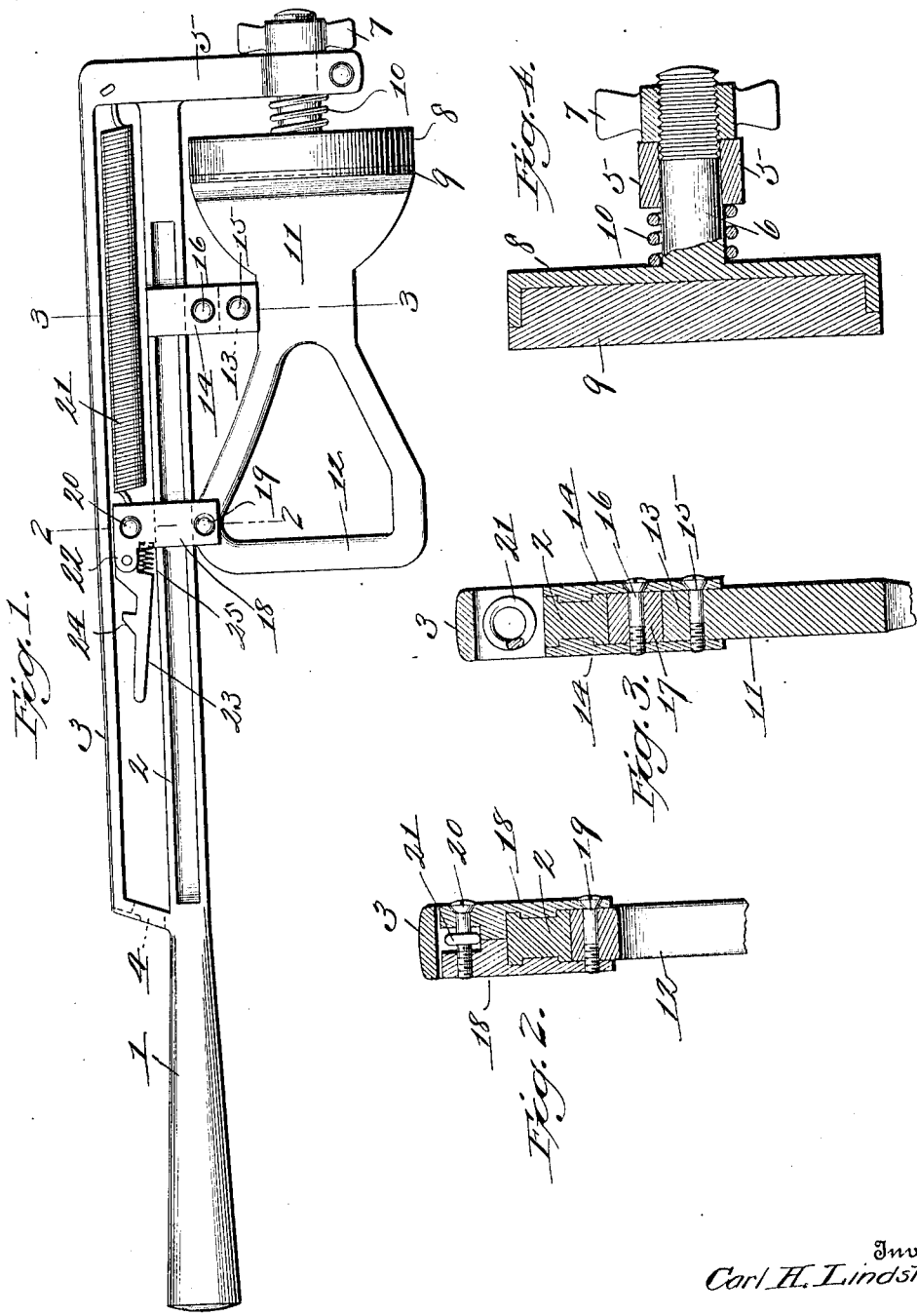
Inventor
Carl H. Lindstrom,
Witnesses
By Chas E Brock
Attorney C. H. LINDSTROM.
DECAPITATING INSTRUMENT.
APPLICATION FILED APR. 22, 1913.
1,090,317.
Patented Mar. 17, 1914.
2 SHEETS—SHEET 2.
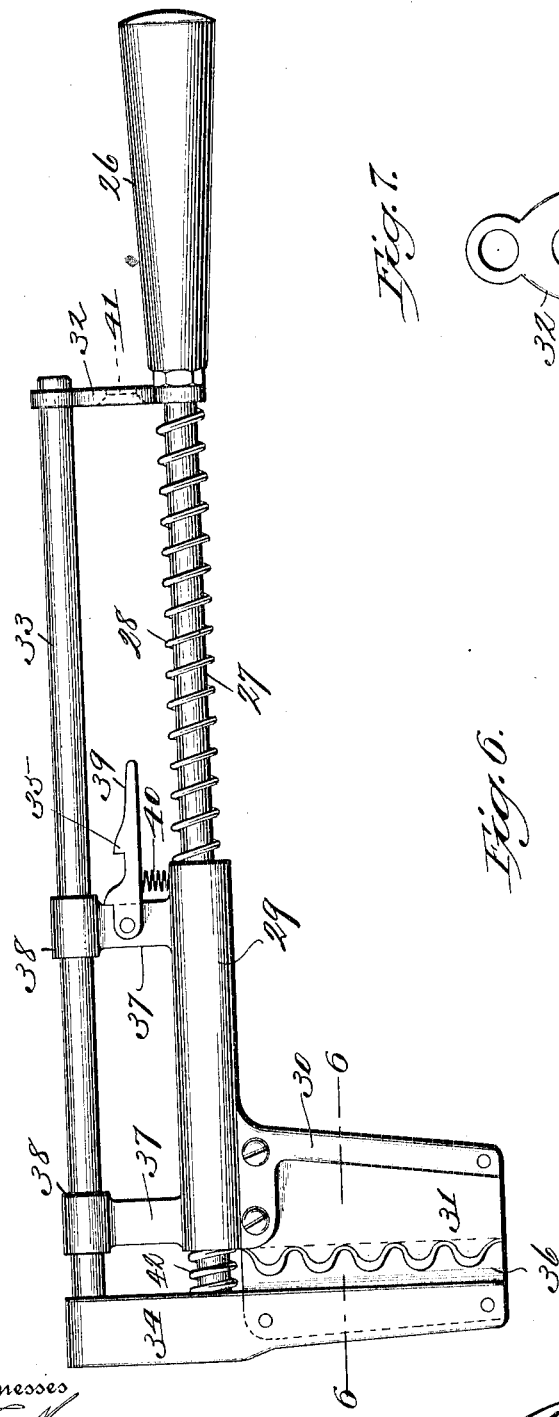
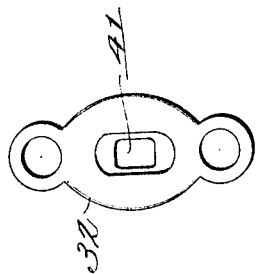
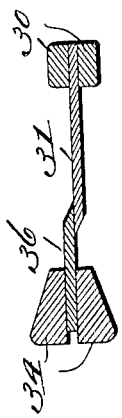
Witnesses
Inventor
Carl H. Lindstrom,
By
Attorney

UNITED STATES PATENT OFFICE.

CARL H. LINDSTROM, OF MILLTOWN, NEW JERSEY.

DECAPITATING INSTRUMENT.

1,090,317. Specification of Letters Patent. Patented Mar. 17, 1914.

Application filed April 22, 1913. Serial No. 762,882.

*To all whom it may concern:*

Be it known that I, CARL H. LINDSTROM, a citizen of the United States, residing at Milltown, in the county of Middlesex and State of New Jersey, have invented a new and useful Improvement in Decapitating Instruments, of which the following is a specification.

This invention relates to a decapitating instrument especially intended for the use of poultry raisers and others engaged in slaughtering fowls for market purposes.

The object of the invention is to provide a handy and easily operated device which will perform its work quickly and with certainty.

With these objects in view the invention consists of the novel features of construction hereinafter described, pointed out in the claims and shown in the accompanying drawings, in which:

Figure 1 is a side elevation. Fig. 2 is a section on the line 2—2 of Fig. 1. Fig. 3 is a section on the line 3—3 of Fig. 1. Fig. 4 is an enlarged sectional view taken diametrically through a cushioning block. Fig. 5 is a side elevation of a modified form of construction. Fig. 6 is a section on the line 6—6 of Fig. 5. Fig. 7 is a face view of an end plate.

In these drawings 1 designates a handle provided with a channeled shank 2 and a bracket 3, said bracket being arranged on one side of the shank and connecting at one end to the handle, said connecting end being provided with an opening shown in dotted lines in Fig. 1 at 4. The opposite end of the bracket is connected to the shank and extends transversely with respect thereto, thereby forming an arm 5 the free end of which is split and through said split portion passes a bolt 6 upon the projecting threaded end portion of which is arranged a thumb nut 7. The bolt carries an integral cap 8 within which is fitted a cushioning block 9 of wood or other suitable material. A spring 10 surrounds the bolt 6 and is interposed between the arm 5 and a cap 8.

A cutting instrument 11 of any desired size and shape is provided with a suitable cutting edge adapted to normally bear upon the block 9. The instrument 11 which may be in the form of either a knife or hatchet is provided with a handle portion 12 and said instrument carries upon one side a lug 13. Plates 14 overlap said lug and are secured thereto by a screw 15 and said plates are shaped to conform to channeled shank 2, sliding thereupon. A washer or filling block 17 is preferably inserted between the shank 2 and the lug 13 and is held in position by a screw 16 forming also a bearing for said screw. Similar plates 18 are connected by a screw 19 to the handle 12, but extend into the space between bracket 3 and shank 2 and the screw 20 passing through said plates forms a point to which one end of a spring 21 is secured the opposite end of the spring being secured to the arm 5. The plates 18 are provided with ears 22 between which are pivoted a tripping device 23 having a lug 24 and normally held in proper position by a spring 25.

Upon grasping the handle 1 with one hand and the handle 12 with the other and drawing the handle 12 rearwardly toward the handle 1 the spring 21 will be stretched and the trigger 23 passed through the opening 4 and the lug 24 will engage the rear end of the bracket 23 thus locking the device in set position. Upon depressing the trigger 23 the lug 24 will be disengaged from the end of the bracket and the spring 21 will quickly and forcibly draw the parts back into the position shown in Fig. 1, thereby severing the head of the fowl which had been placed between the cutting edge of the block 9.

In Fig. 5 I have shown a cutting instrument operating substantially in the same manner as the one above described but operating by a compression of a spring instead of by stretching the spring. In the form shown in Fig. 5 I employ a handle 26 having a cylindrical shaft 27 about which is coiled a spring 28 and upon which is mounted a sleeve 29, said sleeve has a laterally extending slotted bracket 30 between the members of which is secured a cutting blade 31 have preferably a serrated edge. An end plate 32 is arranged adjacent the handle 26 and the rod 33 parallel with the rod 27 has one end mounted in a plate 32 and the other end carries a split arm 34 between the members of which are secured a cutting blade 36 similar to the blade 31 and adapted to coöperate therewith the two blades overlapping when in normal position. The sleeve 29 is provided with arms 37 which carries sleeves 38 adapted to slide upon the rod 33. One of these arms carries a trigger 39 held in normal position by spring 40. The end plate 32 has an opening 41 adapted to receive the trigger 39, said trigger being provided with a lug 35 adapted to engage the outer face of the plate 32 and lock the device in set position. It will be obvious that by drawing back the sleeve 29 the trigger 39 will be passed through the opening 41 and the lug 35 will be locked in engagement with the face of the end plate 32 by means of the spring 40. Upon depressing the trigger 39 against the tension of said spring 40 the spring 38 will return the parts to normal position. A spring 42 acts as a cushion spring for the sleeve 29.

What I claim is:

1. A device of the kind described comprising a shank having a channeled and a handle portion, a cutting instrument also provided with a handle portion, and slidable parallel to said shank, means carried by the cutting instrument slidable upon said channeled portion of the shank, a cushion adapted to be engaged by the cutting instrument, and a spring adapted to draw said cutting instrument into engagement with said cushion.

2. A device of the kind described comprising a shank, a handle connected thereto, an arm at right angles to said shank, a spring pressed cushion carried by said arm, a cutting instrument having a handle, plates carried by said cutting instrument and slidable upon opposite sides of said shank, a second set of plates carried by the handle portion of the cutting instrument and overlapping said shank, a spring connected at one end to the arm and at the other end to the second mentioned plates, and a tripping device also carried by the second mentioned plates.

3. A device of the kind described comprising a handle, a channeled shank, a bracket carried by said shank, the bracket having an opening in the end adjacent the handle, and extending across the other end of the shank thereby forming an arm, a cushioned cap carried by said arm, a cutting instrument slidable along the channel of the shank, plates carried by the cutting instrument extending transversely across said shank, a spring connected at one end to the bracket and at the other end to said plates, a trigger pivoted between said pair of plates and adapted to enter the opening in said bracket, a spring engaging said trigger, and a lug on the trigger adapted to engage the bracket.

CARL H. LINDSTROM.

Witnesses:
 FRANK T. LARSEN,
 Mrs. J. A. HEADLEY.

Copies of this patent may be obtained for five cents each, by addressing the "Commissioner of Patents, Washington, D. C."